United States Patent [19]

Cebalo

[11] 3,856,503

[45] Dec. 24, 1974

[54] HERBICIDAL METHOD AND COMPOSITIONS

[75] Inventor: Tony Cebalo, Indianapolis, Ind.

[73] Assignee: Air Products and Chemicals, Inc., Allentown, Pa.

[22] Filed: Jan. 22, 1973

[21] Appl. No.: 325,485

Related U.S. Application Data

[63] Continuation-in-part of Ser. No. 77,719, Oct. 2, 1970, Pat. No. 3,726,892, which is a continuation-in-part of Ser. No. 867,385, Oct. 17, 1969, abandoned.

[52] U.S. Cl. .................................... 71/90
[51] Int. Cl. ............................. A01n 9/12
[58] Field of Search ......................... 71/90

[56] References Cited
UNITED STATES PATENTS

| | | | |
|---|---|---|---|
| 3,657,264 | 4/1972 | Rucker et al. | 71/90 |
| 3,658,830 | 4/1972 | Pilgram | 71/90 |

*Primary Examiner*—James O. Thomas, Jr.
*Attorney, Agent, or Firm*—Leroy Whitaker

[57] ABSTRACT

Unwanted plants are controlled by applying a phytotoxic amount of a thiadiazole compound having the general structure:

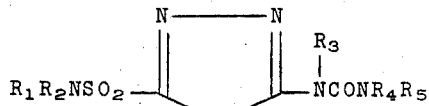

wherein
$R_1$ is hydrogen or a substituted or unsubstituted lower alkyl radical, the substituents being selected from the class consisting of halo, hydroxy, cyano, and lower alkoxy;
$R_2$ is $R_1$ or a lower alkoxy radical, except that $R_1$ and $R_2$ cannot both be hydrogen;
$R_3$ is hydrogen or a lower alkyl radical;
$R_4$ is hydrogen, a lower alkyl radical, or a lower cycloalkyl radical; and
$R_5$ is hydrogen, a lower cycloalkyl radical, a lower alkoxy radical or a substituted or unsubstituted lower alkyl radical, the substituents being selected from the class consisting of halo, hydroxy, cyano, or lower alkoxy, except that $R_4$ and $R_5$ cannot both be hydrogen or a lower cycloalkyl radical.

10 Claims, No Drawings

HERBICIDAL METHOD AND COMPOSITIONS

CROSS-REFERENCE TO RELATED APPLICATIONS

This application is a continuation-in-part of my copending application Ser. No. 77,719, filed Oct. 2, 1970, now U.S. Pat. No. 3,726,892 which in turn is a continuation-in-part of then copending application Ser. No. 867,385, filed Oct. 17, 1969, now abandoned.

BACKGROUND OF THE INVENTION

This invention relates to vegetation control employing thiadiazoles. More particularly, it relates to vegetation control employing thiadiazol-2-ylureas containing a sulfonamide group in the 5-position.

The prior art is replete with thiadiazoles and various derivatives thereof. However, none are believed to have the specific structure or types of activities claimed in the present invention. The few somewhat related compounds shown in the prior art such as, for example, 1-(5-methyl-1,3,4-thiadiazol-2-yl)-3-phenylthiourea and 1-(5-methyl-1,3,4-thiadiazol-2-yl)-3-phenylurea [J. Pharm. Soc. Japan 74, 1044–8 (1054); CA 11630] were not reported to have biological activity. Compounds similar to the present invention are also disclosed in Belgian Patent 721,034.

An article in Farmaco Ed. Sci. 22 (6), 393-401 (1967) discloses the use of 1-(5-alkyl-1,3,4-thiadiazol-2-yl)ureas as intermediates for the production of isomeric 1,3-bis-(5-alkyl-1,3,4-thiadiazol-2-yl)ureas which latter compounds are alleged to exhibit hypoglycemic action. These compounds are only generally related to those employed in the instant invention.

It is known to control vegetation by the use of phytotoxic chemicals. Many such phytotoxic chemicals have been disclosed in the prior art. Certain herbicidal thiadiazolylureas are described, for example, in South African Pat. No. 69/1559, published Sept. 22, 1969. It is not believed that compounds of the type disclosed herein have been used previously in the control of vegetation.

SUMMARY

Unwanted plants are controlled by applying to such vegetation or the seeds thereof a phytotoxic amount of a compound having the formula

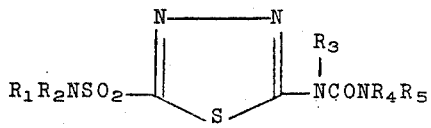

wherein
$R_1$ is hydrogen or a substituted or unsubstituted lower alkyl radical, the substituents being selected from the class consisting of halo, hydroxy, cyano and lower alkoxy;
$R_2$ is hydrogen, a lower alkoxy radical, or a substituted or unsubstituted lower alkyl radical, the substituents being selected from the class consisting of halo, hydroxy, cyano and lower alkoxy, provided that $R_1$ and $R_2$ cannot both be hydrogen;
$R_3$ is hydrogen or a lower alkyl radical;
$R_4$ is hydrogen, a lower alkyl radical or a lower cycloalkyl radical; and
$R_5$ is hydrogen, a lower cycloalkyl radical, a lower alkoxy radical, or a substituted or unsubstituted lower alkyl radical, the substituents being selected from the class consisting of halo, hydroxy, cyano, or lower alkoxy, provided that $R_4$ and $R_5$ cannot both be hydrogen or a lower cycloalkyl radical;
and tautomers thereof wherein $R_3$ is hydrogen.

Novel herbicidal compositions comprising a compound of the above formula and an inert diluent are also claimed.

DESCRIPTION OF THE PREFERRED EMBODIMENT

In the above formula the terms "lower alkyl radical," "lower cycloalkyl radical," and "lower alkoxy radical" are intended to mean such radicals containing up to seven carbon atoms. For example, such terms include methyl, ethyl, propyl, isopropyl, t-butyl, hexyl, heptyl, methoxy, ethoxy, isopropoxy, n-hexyloxy, cyclopropyl, cyclobutyl, cyclopentyl, cyclohexyl and cycloheptyl.

It is to be understood that when $R_3$ is hydrogen the compound can exist in the tautomeric form:

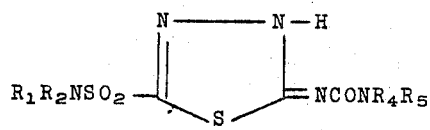

Generally, the compounds of the present invention may be prepared by one or more of the synthesis routes set forth below. The type of product desired will determine the particular synthesis routed to be employed.

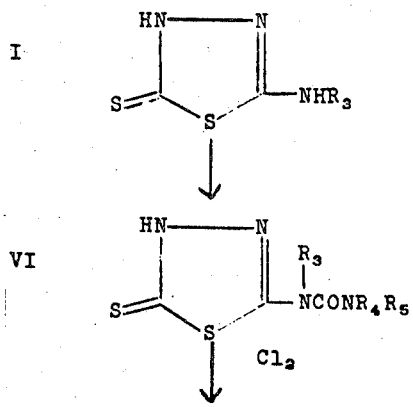

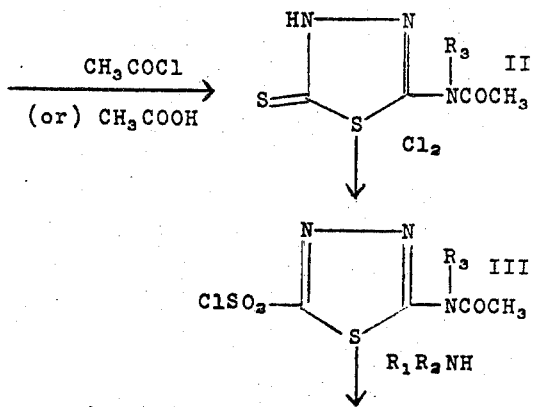

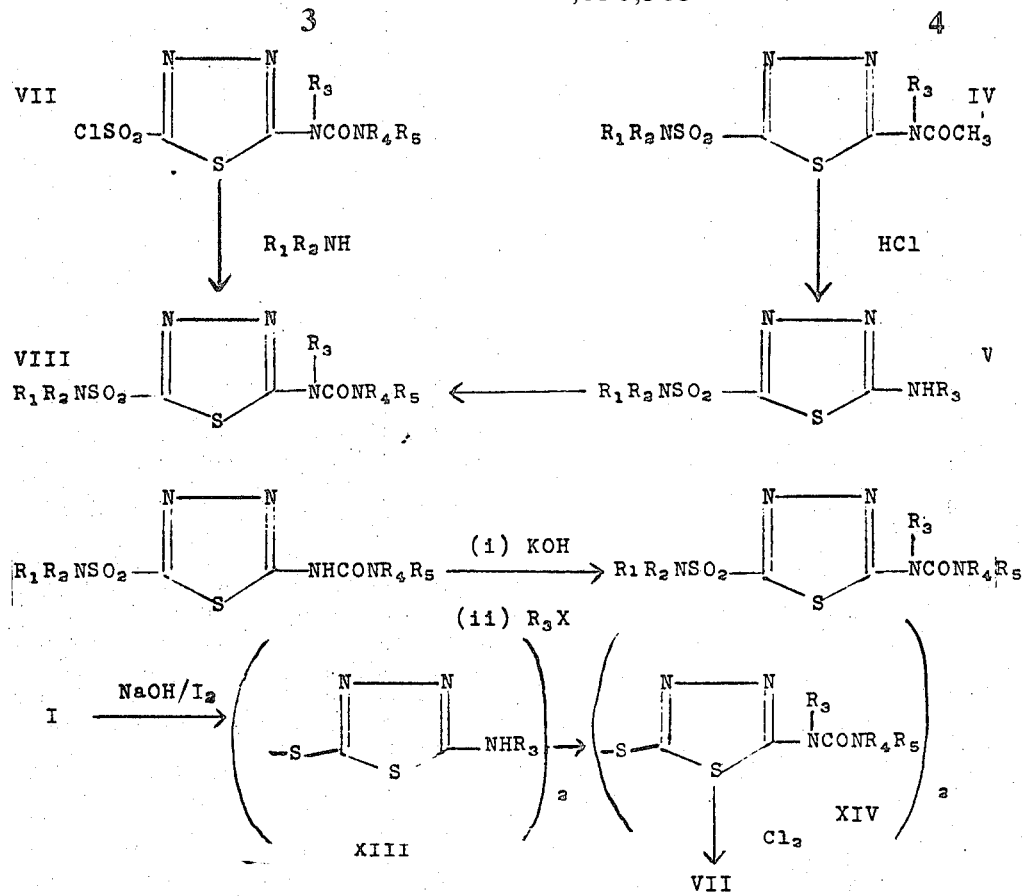

Generally, the compounds corresponding to formula (I) are known; however, others are prepared by standard methods. The 5-acetamido-1,3,4-thiadiazoles (II) utilized are prepared by known methods from (I) and the corresponding sulfonyl chlorides (III) are also prepared by known methods. A particularly useful method is that of Petrow et al. (J. Chem. Soc. 1508, 1958). The sulfonamides (IV) are prepared by the reaction of the sulfonyl chlorides with primary or secondary amines in aqueous or nonaqueous solutions at temperatures of 0°–60° C., preferably in the range 0°–10° C. For nonaqueous reactions inert solvents such as benzene, halogenated hydrocarbons, tetrahydrofuran and the like can be used. The 2-amino-5-sulfonamido-1,3,4-thiadiazoles (V) are obtained by the treatment of compounds (IV) with concentrated hydrochloric acid according to the method of Petrow et al. (loc. cit.).

A number of 2-ureido-1,3,4-thiadiazole sulfonyl chlorides (VII) and 2-ureido-1,3,4-thiadiazole sulfonamides (VIII) are prepared by methods similar to those employed to produce compounds (III) and (IV).

Other ureido compounds may be derived from compound (V) according to a variety of methods which are used for the preparation of such compounds and which are well documented in the chemical literature. For example, compounds of structure (V) may be reacted with isocyanates in an inert solvent such as benzene, dimethylformamide, ethyl acetate and the like. A catalyst such as triethylamine may be employed for this reaction.

Another reaction which may be employed is that in which a carbamoyl chloride is reacted with an amine in the presence of an acid fixing compound such as sodium carbonate, triethylamine, pyridine and the like. Another variation of this reaction is the reaction of a metal derivative of an amine with a carbamoyl chloride. Inert solvents such as benzene, tetrahydrofuran, dimethyl formamide, dioxane and the like may be used to carry out the above reaction.

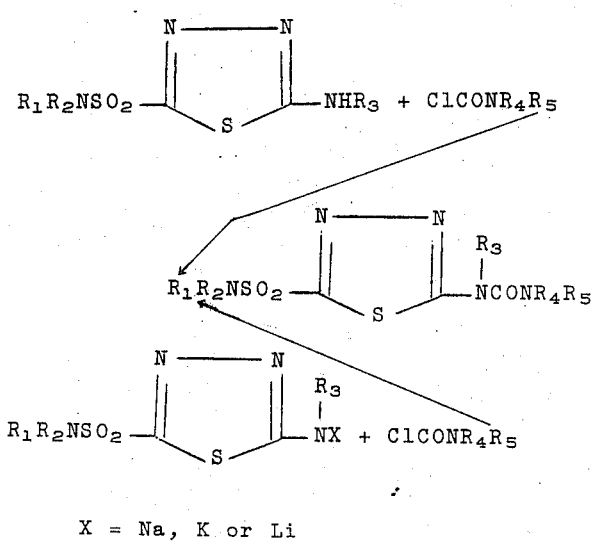

X = Na, K or Li

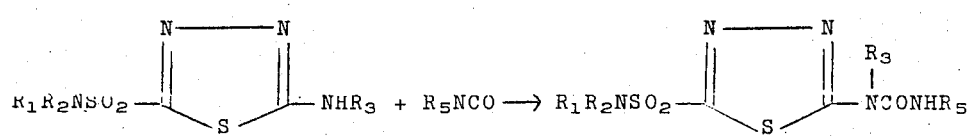

A further reaction which may be employed is that in which N,N'-carbonyldiimidazole is reacted with an aminothiadiazole to give an intermediate isocyanate which is then further reacted with an amine to produce the desired product.

The following examples are illustrative of the invention and are not intended to limit the scope thereof.

SYNTHESIS OF INTERMEDIATES

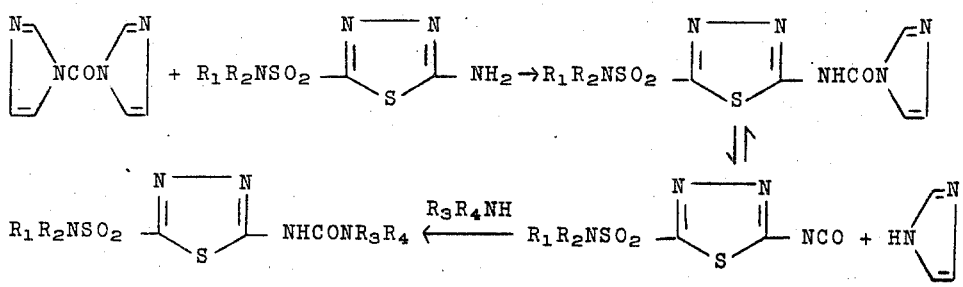

Phosgene may also be reacted with an amine to give a carbamoyl chloride which is then further reacted with a primary or secondary amine to produce the desired urea product. This reaction may be carried out in the presence of a base, e.g., tertiary amine, and/or a catalyst such as boron trifluoride-ether complex. These reactions can also be carried out in inert solvents such as aromatic hydrocarbons, dimethyl formamide, tetrahydrofuran and the like.

EXAMPLE 1

To a well stirred mixture containing 231 gms. of polyphosphoric acid and 488 gms. of acetic acid and heated to 100° C. was added 300 gms. of 2-amino-5-mercapto-1,3,4-thiadiazole. Upon complete addition of the thiadiazole, the mixture was stirred for an additional one hour at 120° C. The mixture was cooled to 60° C. and poured into ice water to provide a solid residue which was subsequently separated by filtering. The residue

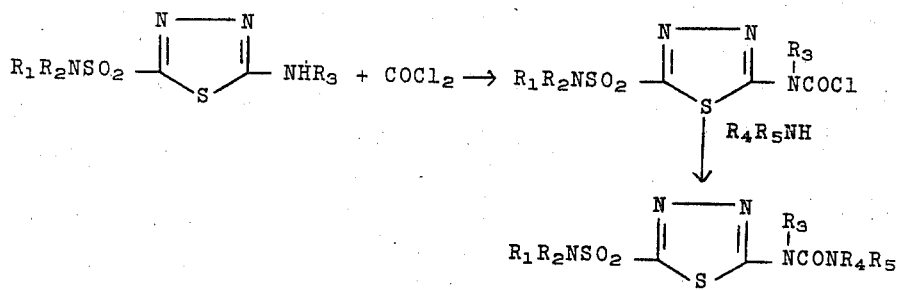

The ureas of the invention which correspond to the generic formula (IX) will form metal or ammonium salts (substituted or unsubstituted) corresponding to structure (X). For polyvalent metals, these salts are chelate in character. The alkali metal and ammonium salts also possess the highly desirable property, for agricultural applications, of being water soluble. Furthermore, alkali metal salts are found to react with reactive halogen compounds, e.g., alkyl halides, to produce derivatives as shown in (XI) and (XII) below.

was dissolved in 10 percent sodium hydroxide (the small amount of insolubles being removed by filtering) and the solution being adjusted to a pH of one with 6N hydrochloric acid. The solid product was identified to be 2-acetamido-5-mercapto-1,3,4-thiadiazole having a melting point of 293°–294° C.

EXAMPLE 2

One hundred fifty grams of 2-acetamido-5-mercapto-1,3,4-thiadiazole was suspended in 3.5 litres of 70 per-

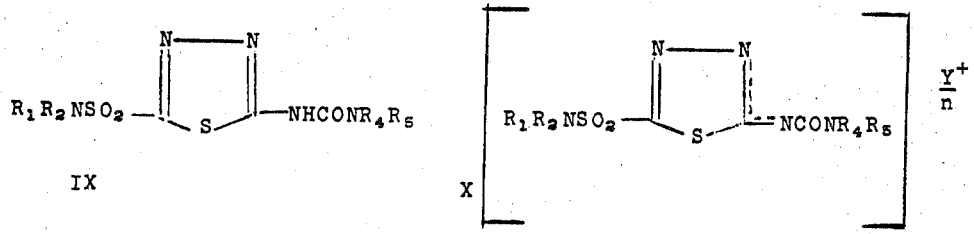

Y = metal or ammonium radical
n = equivalence of Y

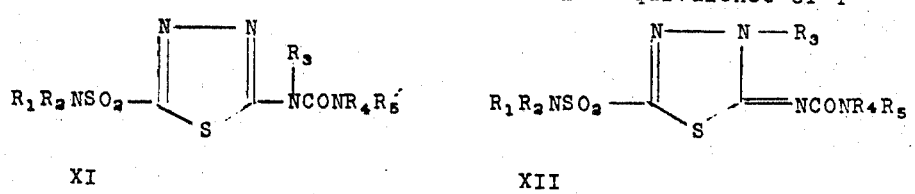

XI
XII cent acetic acid and cooled to a temperature of 0°–5° C. A stream of chlorine gas was slowly bubbled through the cooled mixture at the above temperature for about 2 hours with vigorous stirring. The solids were separated by filtering, washed with ice water and air dried. The solid product was identified to be 2-acetamido-5-chlorosulfonyl-1,3,4-thiadiazole having a melting point of 237°–239° C.

EXAMPLE 3

Two hundred fifty milliliters of a 40 percent solution of aqueous dimethylamine was added to 168.5 gms. of 2-acetamido-5-chlorosulfonyl-1,3,4-thiadiazole while maintaining the temperature below 20° C. After stirring the mixture for about 4 hours the mixture was acidified with 6N hydrochloric acid, the solids separated by filtration and washed thoroughly with water. The solid product was identified to be 2-acetamido-5-N,N-dimethylsulfonamido-1,3,4-thiadiazole having a melting point of 258°–260° C.

EXAMPLE 4

A mixture containing 181.6 gms. of 2-acetamido-1,3,4-thiadiazole-5-N,N-dimethylsulfonamide and 1000 mls. of concentrated hydrochloric acid was refluxed for about 3½ hours. The mixture was cooled to room temperature, filtered and the filtrate concentrated to dryness under vacuum. The solid residue was admixed with 200 mls. of 10 percent aqueous sodium carbonate and filtered. The resulting solid residue was identified to be 2-amino-1,3,4-thiadiazole-5-N,N-dimethylsulfonamide and having a melting point of 184°–186° C.

EXAMPLE 5

A mixture containing 8.0 gms. of 2-amino-5-mercapto-1,3,4-thiadiazole, 3.4 gms. of methyl isocyanate and 150 mls. of N,N-dimethylformamide was heated to 50° C. for about one hour. The reaction mixture was concentrated under vacuum and ice water subsequently added to the concentrate. The solid residue was separated by filtration and identified to be 1-methyl-3-(5-mercapto-1,3,4-thiadiazole-2-yl)urea having a melting point of 234°C.

EXAMPLE 6

Sixty grams of 1-methyl-3-(5-mercapto-1,3,4-thiadiazol-2-yl)urea was suspended in 1.32 litres of 70 percent acetic acid, the mixture being formed in a flask equipped with a mechanical stirring means. The mixture was cooled to about 5° C. and chlorine gas slowly bubbled through for about 45 minutes while maintaining the 5° C. temperature. The resulting solids were separated by filtration, washed with water and air dried. The product was identified to be 1-methyl-3-(5-chlorosulfonyl-1,3,4-thiadiazol-2-yl)urea having a melting point of 141° C.

SYNTHESIS OF FINAL PRODUCTS

EXAMPLE 7

Twenty grams of 1-methyl-3-(5-chlorosulfonyl-1,3,4-thiadiazol-2-yl)urea was dissolved, with stirring, in 250 mls. of a 40 percent aqueous solution of methylamine while maintaining the temperature of the reaction from about 5°–7° C. After stirring for an additional 1½ hours, the mixture was acidified to pH 1 with 6N hydrochloric acid, the solids were separated by filtration and subsequently washed with water. The final product was identified to be 1-methyl-3-(5-N-methylsulfamoyl-1,3,4-thiadiazol-2-yl)-urea having a melting point of 232°–233° C.

EXAMPLE 8

A mixture containing 4.1 gms. of 2-amino-1,3,4-thiadiazole-5-N,N-dimethylsulfonamide and 1.3 gms. of methylisocyanate was refluxed in anhydrous benzene for 3 hours. The mixture was cooled to 10° C., the solid product was separated by filtration and subsequently crystallized from ethanol. The final product was identified to be 1-methyl-3-(5-N,N-dimethylsulfamoyl-1,3,4-thiadiazol-2-yl)urea having a melting point of 223°–235° C.

EXAMPLE 9

A mixture containing 18.0 gms. of 2-amino-1,3,4-thiadiazole-5-(N-methyl-N-butyl)sulfonamide, 5.4 gms. of methylisocyanate and 300 mls. of anhydrous dimethylformamide was heated to and maintained at 50° C. for about 1 hour. The dimethylformamide was removed under vacuum and the solid residue crystallized from solox. The final product was identified to be 1-methyl-3-(5-N-butyl-N-methylsulfamoyl-1,3,4-thidiazol-2-yl)urea having a melting point of 192°–193° C.

EXAMPLE 10

The procedure of Example 9 was substantially repeated except that 13.8 gms. of 2-amino-1,3,4-thiadiazole-5-N-butyl-sulfonamide, 4.3 gms. of methylisocyanate and 250 mls. of anhydrous dimethylformamide were employed. The final product was identified to be 1-methyl-(5-N-butylsulfamoyl-1,3,4-thiadiazol-2-yl)urea having a melting point of 186°–187° C.

EXAMPLE 11

A mixture containing 28.2 gms. of 2-amino-1,3,4-thia-diazole-5-N,N-dimethylsulfonamide, 12.5 gms. cyclopropylisocyanate and 400 mls. of anhydrous dimethylformamide was heated to and maintained at 50° C. for about 1 hour. The dimethyl-formamide was removed under vacuum, leaving a solid residue which was crystallized from methanol. The final product was identified to be 1-cyclopropyl-3-(5-N,N-dimethylsulfamoyl-1,3,4-thiadiazol-2-yl)urea having a melting point of 216° C.

EXAMPLE 12

To a mixture containing 28.2 gms. of 2-amino-1,3,4-thiadiazole-5-N,N-dimethylsulfonamide and 18.4 gms. of N-butyl-N-methyl carbamoyl chloride in 150 mls. of anhydrous tetrahydrofuran, was added in small portions, 4.7 gms. of sodium hydride. The reaction mixture was stirred for 1½ hours, water added and the mixture subsequently extracted with ethyl acetate. The ethyl acetate solution was dried over anhydrous sodium sulfate and concentrated under vacuum. The solid residue was crystallized from ethyl acetate. The final product was identified to be 1-butyl-1-methyl-3-(5-N,N-dimethylsulfamoyl-1,3,4-thiadiazol-2-yl)urea having a melting point of 163°–165° C.

EXAMPLE 13

To a mixture containing 100 mls. of methanol, and 10 gms. 1-methyl-3-(5-N,N-dimethylsulfamoyl-1,3,4-thiadiazol-2-yl)-urea was added 2.4 gms. of potassium hydroxide and 5.4. gms. of methyl iodide, the entire mixture being refluxed for 30 minutes. The solids were separated by filtration and the filtrate concentrated under vacuum to provide a solid residue. The residue was recrystallized from methanol. The final product was identified to be 1,3-dimethyl-3-(5-N,N-dimethylsulfamoyl-1,3,4-thiadiazol-2-yl)urea having a melting point of 209°–212° C.

EXAMPLE 14

To a mixture of 6 gms. of N,N'-carbonyldiimidazole in dry tetrahydrofuran, under an atmosphere of nitrogen, was added 3.5 gms. of 2-amino-1,3,4-thiadiazole-5-N,N-dimethylsulfonamide. The mixture was stirred at room temperature for 30 minutes and subsequently refluxed for about 15 minutes. The reaction mixture was cooled to room temperature and 5.6 gms. of triethylamine and 5.4 gms. of N,O-dimethylhydroxylamine hydrochloride were added. The resulting mixture was stirred for about 15 minutes after which the mixture was poured into ice water. The solid residue was separated by filtering and the residue subsequently crystallized from methanol. The final product was identified to be 1-methyl-1-methoxy-3-(5-N,N-dimethylsulfamoyl-1,3,4-thiadiazol-2-yl)urea having a melting point of 147°–149° C.

EXAMPLE 15

To a stirred suspension of 80 gms. of 5-methylamino-2-mercapto-1,3,4-thiadiazole in 300 mls. of methanol was added, in small portions, 26 gms. of sodium hydroxide. The stirring was continued until a complete solution was obtained (a small amount of insoluble material being removed by filtration). Iodine (66.4 gms.) dissolved in 350 mls. of methanol was next added dropwise to the above stirred solution. A yellow precipitate began to separate after approximately half of the iodine solution had been added. After complete addition of the iodine solution the solids were filtered off and washed with a little methanol to give the desired di-5-(methylamino-1,3,4-thiadiazolyl) disulfide (XIII, $R_3$ = $CH_3$) having a melting point of 202°–204° C.

EXAMPLE 16

A mixture containing 4 gms. of di-5-(2-methylamino-1,3,4-thiadiazolyl) disulfide, 1.6 gms. of methyl isocyanate, and 20 mls. of N,N-dimethylformamide was heated at 100° C. for 1.75 hours. Water was next added to the reaction mixture until a precipitate appeared. The total solids which precipitated on further cooling were removed by filtration and were washed thoroughly with water. The resulting product was identified to be di-5-[1,3,4-dimethyl-3-(1,3,4-thiadiazol-2-yl)urea] disulfide (XIV, $R_4$ = H; $R_3$ = $R_5$ = $CH_3$) having a melting point of 219°–221° C.

EXAMPLE 17

Four grams of di-5-[1,3-dimethyl-3-(1,3,4-thiadiazol-2-yl)urea] disulfide was suspended in 120 mls. of 70 percent acetic acid, the mixture being formed in a flask with mechanical stirring means. The mixture was cooled to about 10° C. and chlorine gas slowly bubbled through for 1 hour while maintaining a temperature range of 10°–15° C. After approximately 30 minutes the reaction mixture became clear. The reaction mixture was next diluted with water and extracted with chloroform. The chloroform solution was washed with water, dried ($Na_2SO_4$) and concentrated under vacuum to give the desired 1,3-dimethyl-3-(5-chlorosulfonyl-1,3,4-thiadiazol-2-yl)urea having a melting point of 98°–100° C. (dec.).

EXAMPLE 18

To a stirred mixture containing 1.5 gms. of 1,3-dimethyl-3-(5-chlorosulfonyl-1,3,4-thiadiazol-2-yl)urea and 0.5 gms. of dimethylhydroxylamine hydrochloride in 20 mls. of tetrahydrofuran was added, dropwise, 1.0 gms. of triethylamine in 5 mls. of tetrahydrofuran and the reaction mixture stirred overnight at room temperature. The reaction mixture was next filtered and the filtrate concentrated under vacuum to a solid residue. This solid was dissolved in ethyl acetate, washed successively with dilute hydrochloric acid and water, dried ($Na_2SO_4$) and concentrated under vacuum. The residual solid was crystallized from aqueous methanol. The final product was identified to be 1,3-dimethyl-3[5-(N-methoxy-N-methyl)sulfamoyl-1,3,4-thiadiazol-2-yl]urea having a melting point of 190°–192° C.

The following additional compounds of the invention were prepared using the above procedures

| Example | $R_1$ | $R_2$ | $R_3$ | $R_4$ | $R_5$ | Melting Point, °C |
|---|---|---|---|---|---|---|
| 19 | $C(CH_3)_3$ | H | H | H | $CH_3$ | 247–249 |
| 20 | $CH_3$ | $CH_2CH(OCH_3)_2$ | H | H | $CH_3$ | 156–158 |
| 21 | $ClCH_2CH_2$ | H | H | H | $CH_3$ | 197–199 |
| 22 | $CH_3$ | $CH_3O$ | H | H | $CH_3$ | 167–169 |
| 23 | $CH_3CHCH_2OCH_3$ | H | H | H | $CH_3$ | 174–176 |
| 24 | $CH_2CN$ | $CH_3$ | $CH_3$ | H | $CH_3$ | 200–202 |
| 25 | $CH_2CN$ | $C_4H_9$ | H | H | $CH_3$ | 127–130 |
| 26 | $CH_3$ | $CH_3$ | H | H | $CH_2CH=CH_2$ | 213–215 |
| 27 | $CH_3$ | $CH_3$ | H | $CH_3$ | $CH_3$ | 187–189 |
| 28 | $CH_2=CHCH_2$ | H H | H | $CH_3$ | 166–168 | |
| 29 | $C_3H_7$ | $C_3H_7$ | H | H | $CH_3$ | 158–159 |
| 30 | $ClCH_2CH_2$ | $ClCH_2CH_2$ | $CH_3$ | H | $CH_3$ | 176–178 |
| 31 | $CH_3$ | $CH_3$ | H | H | $ClCH_2CH_2$ | 198–200 |
| 32 | $CH_3$ | $CH_3$ | $CH_3CH_2$ | H | $CH_3$ | 152–154 |
| 33 | $CH_3$ | $ClCH_2CH_2$ | $CH_3CH_2$ | H | $CH_3$ | 105–107 |
| 34 | $CH_3$ | $CH_3$ | $CH_3CH_2$ | $CH_3$ | $CH_3$ | 68–70 |
| 35 | $CH_3$ | $CH_3$ | $N^-Na^{+1}$ | H | $CH_3$ | 234–236 |
| 36 | $CH_3$ | $CH_2CH(OCH_3)_2$ | $CH_3$ | H | $CH_3$ | 149–151 |
| 37 | $C(CH_3)_3$ | H | $CH_3$ | H | $CH_3$ | 210–212 |
| 38 | $CH_3CH_2$ | $ClCH_2CH_2$ | H | H | $Ch_3$ | 164–166 |
| 39 | $CH_3$ | $CH_3$ | H | $CH_3$ | $CH_2CH(OCH_3)_2$ | 142–144 |

Continued

| Example | $R_1$ | $R_2$ | $R_3$ | $R_4$ | $R_5$ | Melting Point, °C |
|---|---|---|---|---|---|---|
| 40 | $CH_3$ | $CH_3$ | $CH_3$ | $CH_3$ | $CH_3$ | oil |
| 41 | $CH_3$ | $CH_3$ | H | H | $CH_3CHCH_2OCH_3$ | 162–164 |
| 42 | $CH_3$ | $CH_3$ | H | H | $C(CH_3)_2C \equiv CH$ | 202–204 |
| 43 | $di(CH_2CH(OCH_2CH_3)_2)$ | | $CH_3$ | H | $CH_3$ | 101–102 |
| 44 | $CH_3$ | $ClCH_2CH_2$ | $CH_3$ | $CH_3$ | $CH_3$ | oil |
| 45 | H | $CH_2CH(OCH_3)_2$ | $CH_3$ | H | $CH_3$ | 128–130 |
| 46 | H | $CH_3CHCH_2OCH_3$ | $CH_3$ | H | $CH_3$ | 167–169 |
| 47 | $CH_3CH_2$ | $ClCH_2CH_2$ | $CH_3$ | H | $CH_3$ | 155–157 |
| 48 | $CH_3$ | $CH_2CH(OCH_3)_2$ | $CH_3$ | $CH_3$ | $CH_3$ | 78–79 |
| 49 | $CH_3$ | $CH_3$ | $N^-K^{+1}$ | H | $CH_3$ | 213–215 |
| 50 | $CH_3$ | $CH_3$ | $N^-K^{+1}$ | H | $CH_2CH=CH_2$ | 214–216 d. |
| 51 | $CH_3$ | $OCH_3$ | H | $CH_3$ | $OCH_3$ | 133–135 |
| 52 | $CH_3$ | $OCH_3$ | $CH_3$ | $CH_3$ | $CH_3$ | 125–128 |
| 53 | $CH_3$ | $CH_2CN$ | $CH_3$ | $CH_3$ | $CH_3$ | 95–97 |
| 54 | $CH_3$ | $CH_3$ | H | $CH_3$ | $CH_3CHCH_2CH_3$ | 178–180 |
| 55 | $CH_3$ | $ClCH_2CH_2$ | $CH_3$ | H | $CH_3$ | 151–153 |
| 56 | H | $ClCH_2CH_2$ | $CH_3$ | H | $CH_3$ | 151–153 |
| 57 | $CH_3$ | $CH_3CHCH_2CH_3$ | $CH_3$ | H | $CH_3$ | 149–151 |
| 58 | $CH_3$ | $CH_3CHCH_2CH_3$ | $CH_3$ | $CH_3$ | $CH_3$ | 60–62 |
| 59 | $CH_3$ | $OCH_3$ | $CH_3CH_2$ | H | $CH_3$ | 138–140 |

[1] Salt formed at $R_3$ position.

Biological Activity of Final Products

The herbicidal activity of products of the invention was tested in accordance with the procedure hereinafter set forth. For preemergence testing the soil in which seeds were planted was sprayed the same day with a solution containing the designated amount of product in a 50–100 percent acetone-water mixture. Observations of activity were recorded 21 to 28 days after planting and spraying. For postemergence testing the plants were sprayed with the same solution as described above about 14 days after planting of the seeds. A kill rating was adopted to assess the phytotoxicant properties of the products. For both testing procedures a percent kill rating for each species of plants was obtained by comparing the stand of treated plantings with untreated control plants growing under similar conditions.

The results of this test are reported in Tables I and II. The results under each plant species are expressed in terms of percent killed.

In a second series of tests, the plant species to be used as indicators of herbicidal activity were planted in galvanized pans (flats) which were 31.5 cm. long, 21.5 cm. wide and 8 cm. deep. The soil used was a one to one mixture by volume of masonry sand and shredded top soil. The flats were filled two-thirds full with soil and the soil was leveled and tamped. For preemergence testing, the seeds are planted in rows parallel to the long axis, one species per half row. For postemergence testing, the seeds are planted in rows perpendicular to the long axis of the flat, one species per row.

After planting, the seeds were covered with 0.5 to 1.0 cm. of screened, sterilized soil. Two and one-half grams of soluble fertilizer were applied to each flat during the initial watering. The preemergence flats were treated the same day they were planted. Postemergence flats were planted 10 to 13 days prior to treatment and placed in a growth room until the day of treatment. In the growth room, flats received 12 to 18 hours of light each day and the temperature was maintained at 74–80° F. After treatment, both preemergence and postemergence flats were placed in a greenhouse.

Each test compound was dissolved in a one to one mixture of acetone and ethanol containing a small amount of Toximul R and S (a sulfonate/nonionic blend, Stepan Chemical Company, Northfield, Illinois). The solution was then diluted to the appropriate volume with deionized water. The base solution was then serially diluted with deionized water containing 0.1 percent Toximul R and S to obtain the desired concentrations of compound.

The formulated chemicals were applied with a modified DeVilbiss atomizer using an air pressure of 10–12 psi. Each flat received 12.5 ml. of solution, equivalent to a spray volume of 200 gallons per acre.

After treatment, all flats were transferred to a greenhouse for 12–13 days. Herbicidal effects were then rated against each plant species employed. Ratings are based on a 1 to 5 scale as follows:

1 = no injury

2 = slight injury

3 = moderate injury

4 = severe injury

5 = death

The results of this test are reported in Table III. When more than one test was run at the same rate the numbers reported are averages.

In all of the tables that follow, the plant species used are identified by letters appearing across the top of the table. The legend for use in identifying the plants is as follows:

A - Corn (*Zea mays*)
B - Cotton (*Gossypium hirsutum*)
C - Soybean (*Glycine max*)
D - Wheat (*Triticum aesitivum*)
E - Alfalfa (*Medicago sativa*)
F - Sugar Beet (*Beta vulgaris*)
G - Rice (*Oryza sativa*)
H - Cucumber (*Cucumis sativus*)
J - Tomato (*Lycopersicon esculentum*)
K - Barnyardgrass (*Echinochloa crusgalli*)
L - Cocklebur (*Xanthium pensylvanicum*)
M - Large Crabgrass (*Digitaria sanguinalis*)
N - Mustard (*Brassica* sp.)
O - Pigweed (*Amaranthus retroflexus*)
P - Foxtail Millet (*Setaria italica*)
Q - Wild Oat (*Avena fatua*)
R - Velvetleaf (*Abutilon theophrasti*)
S - Morning Glory (*Ipomoea purpurea*)
T - Zinnia (*Zinnia elegans*)
U - Clover (*Malilotus indica*)
V - Buckwheat (*Fagopyrum tataricum*)
W - Jimsonweed (*Datura stramonium*)

TABLE I

Preemergent Activity

| Cpd. No. | Rate, No./A | F | A | Q[1] | U | C | B | N | P[2] | K | M | V | S |
|---|---|---|---|---|---|---|---|---|---|---|---|---|---|
| 8 | 4 | 100 | 100 | 100 | 100 | 100 | 80 | 100 | 100 | 100 | 100 | 100 | 0 |
|  | 2 | 100 | 20 | 80 | 100 | 0 | 20 | 60 | 100 | 100 | 100 | 100 | 0 |
|  | 1 | 100 | 0 | 80 | 100 | 0 | 0 | 20 | 100 | 100 | 100 | 100 | 0 |
|  | 0.5 | 0 | 0 | 0 | 60 | 0 | 0 | 0 | 0 | 40 | 20 | 0 | 0 |
| 13 | 4 | 100 | 100 | 80 | 100 | 100 | 100 | 100 | 100 | 100 | 100 | 100 | 100 |
|  | 2 | 100 | 60 | 100 | 100 | 100 | 100 | 100 | 100 | 100 | 100 | 100 | 100 |
|  | 1 | 100 | 0 | 20 | 100 | 100 | 100 | 100 | 80 | 90 | 100 | 100 | 100 |
|  | 0.5 | 80 | 0 | 10 | 100 | 100 | 0 | 60 | 0 | 30 | 40 | 100 | 100 |
| 14 | 4 | 100 | 0 | 90 | 100 | 100 | 100 | 100 | 100 | 100 | 100 | 100 | 100 |
|  | 2 | 100 | 0 | 90 | 100 | 100 | 100 | 100 | 10 | 100 | 100 | 100 | 100 |
|  | 1 | 100 | 0 | 0 | 100 | 100 | 100 | 100 | 30 | 95 | 95 | 100 | 100 |
|  | 0.5 | 95 | 0 | 0 | 100 | 40 | 0 | 100 | 0 | 90 | 0 | 60 | 95 |
| 27 | 4 | 100 | 100 | 100 | 100 | 100 | 100 | 100 | 100 | 100 | 100 | 100 | 100 |
|  | 2 | 100 | 50 | 90 | 100 | 100 | 80 | 100 | 100 | 100 | 100 | 100 | 100 |
|  | 1 | 100 | 0 | 90 | 100 | 60 | 40 | 95 | 95 | 95 | 100 | 100 | 95 |
|  | 0.5 | 95 | 0 | 20 | 100 | 0 | 0 | 60 | 20 | 60 | 95 | 20 | 0 |

[1] Avena sativa
[2] Setaria glauca

TABLE II

Postemergent Activity

| Cpd. No. | Rate, No./A | F | A | Q | U | C | B | N | P | K | M | V | S | O | W |
|---|---|---|---|---|---|---|---|---|---|---|---|---|---|---|---|
| 8 | 2 | 100 | 0 | 100 | 100 | 100 | 100 | 100 | 100[1] | 100 | 100 | 100 | 10 | — | — |
|  | 1 | 100 | 0 | 100 | 100 | 20 | 80 | 100 | 95[1] | 100 | 100 | 100 | 0 | — | — |
|  | 0.5 | 100 | 0 | 60 | 100 | 0 | 60 | 100 | 80[1] | 90 | 30 | 100 | 0 | — | — |
| 18 | 2 | — | 0 | — | — | — | — | — | 80 | — | 90 | — | 0 | 100 | 80 |
| 19 | 2 | — | 0 | — | — | — | — | — | 20 | — | 20 | — | 0 | 50 | 0 |
| 20 | 2 | — | 0 | — | — | — | — | — | 100 | — | 100 | — | 0 | 100 | 100 |
| 21 | 2 | — | 0 | — | — | — | — | — | 70 | — | 80 | — | 0 | 100 | 70 |

[1] Setaria glauca

TABLE III

Herbicidal Activity

| Cpd. No. | Rate, No./A | Preemergent<br>A B C D E F G H J K L M N O P Q R S T | Postemergent<br>A M O P R S T |
|---|---|---|---|
| 7 | 1 | 1 1 1 1 3 1 1 1 1 1 1 1 2 1 1 1 — 1 1 | 3 4 5 4 5 1 5 |
|  | 2 | 1 1 1 1 5 2 1 2 2 1 1 2 3 2 3 1 — 1 2 | 4 4 4 4 3 1 5 |
|  | 4 | 2 2 1 2 5 4 2 2 4 3 3 5 5 4 4 3 — 2 5 | 3 5 5 5 4 1 5 |
|  | 8 | 3 — — — — — — — — — — 4 — 4 5 — — 2 4 | 4 5 5 5 1 1 5 |
| 8 | 1 | 4 5 5 5 5 5 4 5 5 5 5 5 5 5 3 1 5 | 3 5 5 5 5 2 5 |
|  | 2 | 5 5 5 5 5 5 4 5 5 5 5 5 5 5 5 2 5 | 4 5 5 5 5 3 5 |
|  | 8 | 5 — — — — — — — — — 4 — 5 5 — 4 4 5 | 5 5 5 5 5 5 5 |
| 10 | 1 | — — — — — — — — — — — — — — — — — — — | 1 2 3 3 1 1 3 |
|  | 2 | — — — — — — — — — — — — — — — — — — — | 2 3 3 3 2 1 3 |
|  | 4 | — — — — — — — — — — — — — — — — — — — | 2 3 3 3 2 1 3 |
|  | 8 | 1 — — — — — — — — — — — 2 — 2 2 — 1 1 2 | 2 4 4 4 2 1 4 |
| 11 | 8 | 1 — — — — — — — — — — — 2 — 4 1 — 1 1 1 | 1 3 4 4 2 2 3 |
| 13 | 0.125 | — — — — — — — — — — — — — — — — — — — | 3 4 5 5 5 4 5 |
|  | 1 | 1 1 1 2 3 4 1 4 4 2 1 3 3 4 3 2 4 2 4 | 2 4 5 4 4 5 5 |
|  | 2 | 3 2 1 2 4 4 1 4 4 2 2 3 4 4 3 3 4 3 4 | 4 5 5 5 4 5 5 |
| 14 | 1 | 2 4 3 3 4 3 2 3 4 4 5 3 5 5 4 2 5 3 4 | 2 4 4 5 2 4 5 |
|  | 2 | 2 3 3 3 5 4 2 4 4 4 3 4 5 4 4 3 4 2 4 | 2 4 5 5 4 5 5 |
|  | 4 | 5 5 5 5 5 5 5 5 5 5 5 5 5 5 5 5 5 5 5 | 4 5 5 5 5 5 5 |
| 18 | 1 | 1 1 1 1 1 3 1 1 2 1 1 2 3 2 2 3 — 1 1 | 1 4 5 5 4 4 5 |
|  | 2 | 1 1 1 1 2 2 1 2 4 2 1 2 3 3 3 3 — 2 3 | 2 4 5 4 5 4 5 |
|  | 4 | 2 1 1 1 2 3 1 5 5 3 — 3 3 2 3 3 — 3 5 | 2 3 5 4 4 4 5 |
| 19 | 1 | 1 1 1 1 1 1 1 1 1 1 1 1 1 1 1 1 1 1 1 | 1 2 2 1 3 1 4 |
|  | 2 | 1 1 1 1 1 2 1 1 1 1 1 1 1 1 1 1 1 1 1 | 1 2 3 3 2 1 2 |
|  | 4 | 1 1 1 1 1 3 2 2 1 1 1 1 1 1 1 1 1 1 3 | 2 4 4 3 3 1 5 |
|  | 8 | 1 — — — — — — — — — — — 1 — 1 2 — 1 1 2 | 2 3 4 4 3 1 4 |

TABLE III—Continued

Herbicidal Activity

| Cpd. No. | Rate, No./A | Preemergent<br>A B C D E F G H J K L M N O P Q R S T | Postemergent<br>A M O P R S T |
|---|---|---|---|
| 20 | 1 | 1 1 1 1 1 1 1 1 1 1 1 1 1 1 1 1 1 1 1 | 2 4 4 4 5 2 4 |
|  | 2 | 1 1 1 1 1 3 2 2 1 3 1 2 1 1 2 1 1 1 2 | 1 5 5 4 3 2 5 |
|  | 4 | 2 1 2 3 2 4 3 3 3 3 2 4 3 2 3 2 2 1 2 | 3 5 5 5 4 1 5 |
| 21 | 1 | 1 1 1 1 1 2 1 1 1 1 1 1 1 1 1 1 1 1 1 | 1 4 4 4 4 1 5 |
|  | 2 | 1 1 1 1 1 2 1 1 1 1 1 1 2 — 1 1 — 1 1 | 1 4 4 4 2 1 4 |
|  | 4 | 1 1 1 1 1 2 1 1 1 1 1 1 2 2 1 1 1 1 1 | 1 3 4 3 3 1 5 |
| 22 | 1 | 1 1 1 1 1 3 2 1 1 1 1 1 1 1 1 1 1 1 1 | 1 4 4 4 3 1 5 |
|  | 2 | 1 1 1 1 1 4 2 1 2 2 1 1 1 2 2 1 1 1 1 | 1 4 5 4 3 1 5 |
|  | 4 | 1 2 2 1 3 5 3 1 2 2 2 3 2 4 2 2 2 1 3 | 2 3 4 4 4 1 5 |
| 23 | 1 | — — — — — — — — — — — — — — — — — — — | 1 4 5 4 3 1 4 |
|  | 2 | — — — — — — — — — — — — — — — — — — — | 1 4 5 4 3 1 4 |
|  | 4 | — — — — — — — — — — — — — — — — — — — | 3 5 5 4 4 2 4 |
|  | 8 | — — — — — — — — — — 2 — 3 2 — 1 1 1 | 3 5 4 4 5 1 5 |
| 24 | 1 | — — — — — — — — — — — — — — — — — — — | 1 3 4 5 2 4 4 |
|  | 2 | 1 — — — — — — — — — — 2 — 2 — — 2 1 1 | 1 2 4 4 3 2 4 |
| 25 | 1 | — — — — — — — — — — — — — — — — — — — | 1 3 4 4 2 2 4 |
|  | 2 | — — — — — — — — — — — — — — — — — — — | 2 4 5 4 3 2 4 |
|  | 4 | — — — — — — — — — — — — — — — — — — — | 2 4 4 4 3 2 4 |
| 27 | 2 | — — — — — — — — — — — — — — — — — — — | 1 3 4 5 3 3 5 |
|  | 4 | — — — — — — — — — — — — — — — — — — — | 2 4 4 5 2 3 5 |
|  | 8 | — — — — — — — — — — — — — — — — — — — | 5 5 5 5 5 4 5 |
| 28 | 1 | 1 1 1 1 1 1 1 1 1 1 1 1 1 1 1 1 1 1 1 | 1 3 2 4 2 1 3 |
|  | 2 | 1 1 1 1 1 2 1 1 1 2 1 1 1 2 2 3 3 4 3 1 4 |  |
|  |  | 1 1 2 1 1 1 2 1 1 1 1 1 |  |
|  | 4 | 1 1 1 2 3 2 1 1 1 2 1 2 2 3 1 1 2 1 1 | 2 3 3 4 3 1 4 |
| 30 | 2 | 1 — — — — — — — — — 1 — 1 — — 1 1 1 | 1 2 2 2 1 3 3 |
| 31 | 2 | 1 — — — — — — — — — 1 — 1 — — 1 1 1 | 1 1 1 1 1 2 1 |
| 32 | 1 | 2 1 2 2 3 2 2 2 2 3 2 — 3 2 3 4 3 4 1 2 | 2 3 4 4 3 4 4 |
|  | 2 | 3 3 3 3 4 3 1 5 4 2 1 4 4 4 4 4 4 3 4 | 2 4 5 4 4 4 5 |
| 33 | 1 | 1 1 1 1 1 3 1 2 — 2 1 3 2 — 2 2 3 2 2 | 3 4 4 5 4 4 4 |
|  | 2 | 1 1 1 1 2 4 1 3 2 3 1 3 2 4 3 3 3 2 3 | 3 4 4 5 4 5 5 |
| 34 | 1 | 1 1 2 1 1 3 1 2 1 2 1 2 3 — 2 4 3 2 2 | 1 3 4 4 3 4 4 |
|  | 2 | 1 1 2 2 1 4 1 3 2 3 1 2 4 4 3 4 3 3 3 | 2 3 4 4 3 4 4 |
| 35 | 0.05 | — — — — — — — — — — — — — — — — — — — | 1 3 3 3 1 1 3 |
|  | 0.125 | — — — — — — — — — — — — — — — — — — — | 1 3 3 4 1 2 4 |
|  | 0.25 | — — — — — — — — — — — — — — — — — — — | 1 4 4 5 2 2 4 |
|  | 1 | 1 1 1 2 2 2 1 1 1 2 1 4 2 3 3 1 1 1 1 | 2 5 4 5 2 3 5 |
|  | 2 | 2 2 2 2 3 3 2 4 2 3 1 4 5 4 4 2 2 1 4 | 2 5 4 5 1 2 5 |
|  | 4 | 3 3 3 3 4 4 2 4 3 2 1 5 5 5 4 3 3 2 5 | 2 5 5 5 2 3 5 |
|  | 8 | 4 — — — — — — — — — — — 5 — 4 5 — 3 2 4 | 4 5 5 5 3 3 5 |
| 36 | 0.5 | 1 1 1 1 1 2 1 1 1 2 1 1 2 2 1 1 2 1 1 | 1 3 3 4 4 4 5 |
|  | 1 | 2 1 1 1 2 3 1 1 2 2 3 2 4 3 2 1 2 2 1 | 2 4 4 5 4 4 5 |
|  | 2 | 2 1 1 2 3 3 1 2 3 3 3 3 4 3 3 2 2 3 4 | 3 4 5 5 5 5 5 |
|  | 4 | 4 5 4 3 4 4 2 4 4 4 5 5 5 4 5 4 5 5 5 | 4 5 5 5 5 4 5 |
| 37 | 8 | 1 — — — — — — — — — — — 2 — 3 2 — 2 3 3 | 1 3 3 2 3 2 4 |
| 38 | 1 | 1 1 1 1 1 1 1 1 1 1 1 1 1 1 1 1 1 1 1 | 1 4 4 4 2 1 4 |
|  | 2 | 1 1 1 1 1 1 1 1 1 1 1 1 1 2 1 2 1 1 1 2 | 2 4 5 4 3 2 4 |
|  | 4 | 1 1 1 1 1 3 1 1 1 1 1 2 3 3 2 1 1 1 2 | 2 5 5 5 5 3 5 |
| 39 | 1 | 1 1 1 1 1 2 1 2 1 1 1 1 2 1 1 1 1 1 1 | 2 4 4 4 2 3 3 |
|  | 2 | 1 2 1 2 4 3 1 3 2 2 2 2 5 2 2 2 2 2 1 | 1 4 5 4 3 3 4 |
|  | 4 | 3 — — — — — — — — — — 4 — 4 4 — 2 2 2 | 4 5 5 5 4 3 5 |
| 40 | .05 | — — — — — — — — — — — — — — — — — — — | 1 3 3 4 3 3 3 |
|  | 1 | 2 2 1 2 4 5 1 5 4 3 3 3 4 5 4 3 4 5 5 | 4 5 5 5 5 5 5 |
|  | 4 | 5 — — — 5 5 5 5 4 5 5 |  |
|  |  | — — — 4 |  |
|  |  | — 4 5 — 4 5 |  |
|  |  | 5 |  |
| 41 | 0.5 | — — — — — — — — — — — — — — — — — — — | 1 3 4 3 1 1 2 |
|  | 4 | 1 — — — — — — — — — — 1 — 2 2 — 1 1 2 | 1 3 5 3 2 1 4 |
| 42 | 0.5 | — — — — — — — — — — — — — — — — — — — | 1 2 2 1 2 2 3 |
|  | 4 | 2 — — — — — — — — — — 1 — 4 1 — 2 1 2 | 2 3 4 2 4 1 3 |
| 43 | 2 | 1 — — — — — — — — — — — 2 — 1 1 — 1 1 1 | 1 1 1 1 1 1 1 |
|  | 8 | 1 — — — — — — — — — — — 2 — 1 1 — 1 1 1 | 2 2 3 2 2 2 2 |

TABLE III – Continued

Herbicidal Activity

| Cpd. No. | Rate. No./A | Preemergent<br>A B C D E F G H J K L M N O P Q R S T | Postemergent<br>A M O P R S T |
|---|---|---|---|
| 44 | 0.05 | — — — — — — — — — — — — — — — — — — — | 1 2 3 3 1 2 3 |
|  | 2 | 3 2 1 2 5 4 1 3 4 2 3 4 2 3 4 5 5 3 4 | 4 5 5 5 5 5 5 |
| 45 | 0.5 | 1 1 1 1 1 1 1 1 1 1 1 1 1 1 1 1 1 1 1 | 1 2 3 3 3 3 3 |
|  | 2 | 1 1 1 1 3 2 1 2 1 1 1 2 2 2 2 3 3 2 3 | 2 3 4 5 4 4 4 |
| 46 | 0.25 | — — — — — — — — — — — — — — — — — — — | 1 2 3 3 1 3 3 |
|  | 2 | 1 1 1 2 2 3 2 2 2 1 3 1 3 1 2 2 3 2 3 | 1 3 4 5 3 3 4 |
| 47 | 0.25 | — — — — — — — — — — — — — — — — — — — | 2 2 4 3 2 3 3 |
|  | 2 | 1 2 1 2 3 4 1 2 4 3 1 2 1 3 2 2 3 2 2 | 2 4 4 4 3 4 4 |
| 48 | 0.25 | 1 1 1 1 1 1 1 1 1 1 1 1 1 1 1 1 1 1 1 | 1 3 4 3 3 3 3 |
|  | 2 | 4 5 3 3 5 4 3 5 4 2 — 3 3 3 4 5 5 4 4 | 3 5 5 4 5 5 5 |
| 49 | 0.05 | — — — — — — — — — — — — — — — — — — — | 1 3 3 4 1 1 3 |
|  | 4 | 3 3 3 3 4 4 2 4 5 4 3 4 4 4 4 4 3 2 5 | 4 5 5 5 3 3 5 |
|  | 8 | 3 — — — — — — — — — — 4 — 5 5 — 5 2 5 | 5 5 5 5 4 3 5 |
| 50 | 1 | 1 1 1 1 1 2 1 1 1 1 2 1 1 1 1 1 2 1 1 | 1 2 3 2 2 1 1 |
|  | 8 | 1 — — — — — — — — — — 2 — 5 2 — 4 1 5 | 2 4 4 5 3 2 4 |
| 51 | 0.5 | — — — — — — — — — — — — — — — — — — — | 1 2 3 4 2 1 3 |
|  | 1 | 1 1 1 1 1 2 1 1 1 1 1 1 1 1 2 1 1 1 3 | 1 4 4 4 3 2 4 |
|  | 4 | 1 1 1 1 3 3 1 1 3 1 1 2 3 2 1 1 1 1 5 | 2 5 5 5 5 3 5 |
| 52 | 0.125 | — — — — — — — — — — — — — — — — — — — | 1 3 3 3 2 3 3 |
|  | 0.5 | 1 1 1 1 3 2 1 1 3 1 — 1 3 1 1 1 1 1 2 | 2 3 4 4 4 4 4 |
|  | 2 | 2 1 1 2 3 4 1 3 3 2 — 3 4 3 2 3 3 3 4 | 2 3 4 4 4 4 4 |
| 53 | 0.125 | — — — — — — — — — — — — — — — — — — — | 1 3 3 3 2 3 3 |
|  | 2 | 1 — — — — — — — — — — 1 — 2 1 — 2 2 2 | 3 4 4 5 5 4 5 |
| 54 | 2 | 1 — — — — — — — — — — 1 — 1 1 — 1 1 1 | 1 1 3 2 — 3 — |
|  | 8 | 2 — — — — — — — — — — 1 — 1 1 — 1 1 3 | 1 2 4 5 2 4 5 |
| 55 | 0.05 | — — — — — — — — — — — — — — — — — — — | 1 3 3 3 2 3 4 |
|  | 0.5 |  |  |
|  | 2 | 2 1 1 1 2 4 1 2 3 3 — 3 5 3 3 3 3 1 3 | 2 4 5 4 4 4 5 |
| 56 | 0.25 | — — — — — — — — — — — — — — — — — — — | 1 2 2 3 2 3 3 |
|  | 2 | 1 — — — — — — — — — — 1 — 1 2 — 1 1 3 | 2 3 3 4 3 4 4 |
| 57 | 0.125 | — — — — — — — — — — — — — — — — — — — | 1 3 3 4 2 3 3 |
|  | 2 | 2 — — — — — — — — — — 2 — 2 3 — 3 2 4 | 3 4 3 4 4 4 5 |
| 58 | 0.25 | — — — — — — — — — — — — — — — — — — — | 1 3 2 4 3 3 3 |
|  | 1 | 1 1 2 2 2 2 1 2 4 2 1 2 3 3 3 1 2 2 4 | 2 3 4 5 3 4 4 |
|  | 2 | 2 1 1 2 2 5 1 5 5 3 1 2 4 3 2 2 3 3 5 | 3 4 4 4 4 4 5 |
| 59 | 0.5 | — — — — — — — — — — — — — — — — — — — | 1 2 3 3 2 3 3 |
|  | 2 | 1 — — — — — — — — — — 2 — — 1 — 2 2 1 | 1 3 4 3 3 3 3 |

When utilized for herbicidal purposes, compounds of the invention may be formulated in a variety of ways and concentrations for application to the locus of desired vegetation control. Such formulations comprise an inert diluent, liquid or solid, and at least one compound of this invention. It is recognized that the particular type and concentration of formulation, as well as the mode of application of the active ingredient, may govern its biological activity in a given application.

Compounds of the invention may be prepared as simple solutions of the active ingredient in an appropriate solvent in which it is completely soluble at the desired concentration. Such solvent systems include water, alcohols, acetone, aqueous alcohol and acetone, and other organic solvents. These simple solutions may be further modified by the addition of various surfactants, emulsifying or dispersing agents, colorants, odorants, antifoaming agents, other herbicides or herbicidal oils which supplement or synergize the activity of the herbicides of the invention, or other adjuvants for any given application where deemed desirable to impart a particular type or degree of plant responses.

Compounds of the invention may also be formulated in various types of formulations commonly recognized by those skilled in the art of agricultural or industrial chemicals. These formulations include, for example, compositions containing the active ingredient as granules of relatively large particle size, as powder dusts, as wettable powders, as emulsifiable concentrates or as a constituent part of any other known type of formulation commonly utilized by those skilled in the art. Such formulations include the adjuvants and carriers normally employed for facilitating the dispersion of active ingredients for agricultural and industrial applications of phytotoxicants. These formulations may contain as little as 0.25 percent or more than 95 percent by weight of the active ingredient.

Dust formulations are prepared by mixing the active ingredient with finely divided solids which act as dispersants and carriers for the phytotoxicant in applying it to the locus of application for vegetation control. Typical solids which may be utilized in preparing dust formulations of the active ingredients of the invention include talc, kieselguhr, finely divided clay, fullers' earth, or other common organic or inorganic solids. Solids utilized in preparing dust formulations of the active ingredient normally have a particle size of 50 microns or less. The active ingredient of these dust formulations is present commonly fromm as little as 0.25 percent to as much as 30 percent or more by weight of the composition.

Granular formulations of the active ingredients are prepared by impregnating or adsorbing the toxicant on or into relatively coarse particles of inert solids such as sand, attapulgite clay, gypsum, corn cobs or other inorganic or organic solids. The active ingredient of these granular formulations is commonly present from 1.0 percent to as much as 20.0 percent or more by weight of the composition.

Wettable powder formulations are solid compositions of matter wherein the active ingredient is absorbed or adsorbed in or on a sorptive carrier such as finely divided clay, talc, gypsum, lime, wood flour, fullers' earth, kieselguhr or the like. These formulations preferably are made to contain 50 percent to 80 percent of active ingredient. These wettable powder formulations commonly contain a small amount of a wetting, dispersing or emulsifying agent to facilitate dispersion in water or other liquid carrier utilized to distribute the phytotoxicant to the locus of desired vegetation control.

Emulsifiable concentrate formulations are homogeneous liquid or paste compositions containing the active ingredient which will disperse in water or other liquid carrier to facilitate applications of the phytotoxicant to the locus of desired vegetation control. Such emulsifiable concentrate formulations of the active ingredients may contain only the active ingredient with a liquid or solid emulsifying agent or may contain other relatively nonvolatile organic solvents such as isophrone, dioxane heavy aromatic naphthas, xylene, or dimethyl formamide. The active ingredient in such formulations commonly comprises 10.0 percent to 70.0 percent by weight of the phytotoxicant composition.

In place of the particular compositions employed to produce the products of the invention, other compositions and procedures may also be employed to produce products of the invention having substantially the same degree of biological activity.

The compounds described herein can be used to control unwanted plants by either preemergent or postemergent application. However, the compounds are more active when applied postemergent and will probably find their greatest utility in postemergent applications. The compounds show little selectively and should be considered to be active against virtually all plant species until suitable tests have shown a particular species to be tolerant.

As can be seen from the tables, some of the compounds exhibit a high degree of activity at rates as low as 0.05 pounds per acre. On the other hand, some of the less active compounds, such as numbers 9, 12, 26, 27, 30 and 31, may require 15 pounds per acre to exhibit significant activity. Thus, depending upon the particular compound chosen, the plant to be destroyed and weather conditions, a herbicidally effective or phytotoxic amount of the present compounds might range from 0.05 to about 20 pounds per acre. The preferred range is from about 0.5 to about 4 pounds per acre.

The preferred compounds for use in the claimed method and compositions are those wherein $R_3$ in the above formula is lower alkyl. Particularly preferred are 1-(5-dimethylsulfamoyl-1,3,4-thiadiazol-2-yl)-1,3,3-trimethylurea, 1-(5-dimethylsulfamoyl-1,3,4-thiadiazol-2-yl)-1,3-dimethylurea, 1-[5-(N-2-chloroethyl)-N-ethylsulfamoyl)-1,3,4-thiadiazol-2-yl]-1,3-dimethylurea, 1-[5-(N-cyanomethyl-N-methylsulfamoyl)-1,3,4-thiadiazol-2-yl]-1,3,3-trimethylurea, 1-[5-(N-sec-butyl-N-methylsulfamoyl)-1,3,4-thiadiazol-2-yl]-1,3-dimethylurea and 1-[5-(N-sec-butyl-N-methyl-sulfamoyl)-1,3,4-thiadiazol-2-yl]-1,3,3-trimethylurea

I claim:

1. A method for the control of unwanted plants which comprises contacting such plants with a phytotoxic amount of a compound having the formula

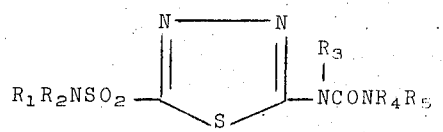

wherein
$R_1$ is hydrogen or a substituted or unsubstituted lower alkyl radical, the substituents being selected from the class consisting of halo, hydroxy, cyano and lower alkoxy;
$R_2$ is hydrogen, a lower alkoxy radical, or a substituted or unsubstituted lower alkyl radical, the substituents being selected from the class consisting of halo, hydroxy, cyano and lower alkoxy, provided that $R_1$ and $R_2$ cannot both be hydrogen;
$R_3$ is hydrogen or a lower alkyl radical;
$R_4$ is hydrogen, a lower alkyl radical or a lower cycloalkyl radical; and
$R_5$ is hydrogen, a lower cycloalkyl radical, a lower alkoxy radical, or a substituted or unsubstituted lower alkyl radical, the substituents being selected from the class consisting of halo, hydroxy, cyano, or lower alkoxy, provided that $R_4$ and $R_5$ cannot both be hydrogen or a lower cycloalkyl radical;
and tautomers thereof wherein $R_3$ is hydrogen.

2. A method as in claim 1 wherein $R_3$ is lower alkyl.
3. A method as in claim 2 wherein the compound is 1-(5-dimethylsulfamoyl-1,3,4-thiadiazol-2-yl)-1,3,3-trimethylurea.
4. A method as in claim 2 wherein the compound is 1-(5-dimethylsulfamoyl-1,3,4-thiadiazol-2-yl)-1,3-dimethylurea.
5. A method as in claim 1 wherein the compound is applied at a rate within the range of from 0.05 to 20 pounds per acre.
6. A method as in claim 5 wherein the compound is applied at a rate within the range of from 0.5 to 4 pounds per acre.
7. A herbicidal composition comprising an inert diluent and from 0.25 to 95 percent by weight of at least one compound of the formula

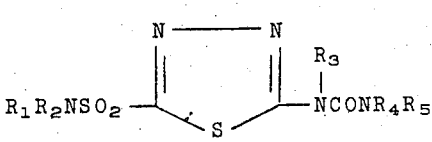

wherein
- $R_1$ is hydrogen or a substituted or unsubstituted lower alkyl radical, the substituents being selected from the class consisting of halo, hydroxy, cyano and lower alkoxy;
- $R_2$ is hydrogen, a lower alkoxy radical, or a substituted or unsubstituted lower alkyl radical, the substituents being selected from the class consisting of halo, hydroxy, cyano and lower alkoxy, provided that $R_1$ and $R_2$ cannot both be hydrogen;
- $R_3$ is hydrogen or a lower alkyl radical;
- $R_4$ is hydrogen, a lower alkyl radical or a lower cycloalkyl radical; and
- $R_5$ is hydrogen, a lower cycloalkyl radical, a lower alkoxy radical, or a substituted or unsubstituted lower alkyl radical, the substituents being selected from the class consisting of halo, hydroxy, cyano, or lower alkoxy, provided that $R_4$ and $R_5$ cannot both be hydrogen or a lower cycloalkyl radical;

and tautomers thereof wherein $R_3$ is hydrogen.

8. A composition as in claim 7 wherein the compound is one wherein $R_3$ is lower alkyl.

9. A composition as in claim 8 wherein the compound is 1-(5-dimethylsulfamoyl-1,3,4-thidiazol-2-yl)-1,3,3-trimethylurea.

10. A composition as in claim 8 wherein the compound is 1-(5-dimethylsulfamoyl-1,3,4-thiadiazol-2-yl)-1)-1,3-dimethylurea.

* * * * *

PO-1050
(5/69)

UNITED STATES PATENT OFFICE
CERTIFICATE OF CORRECTION

Patent No. 3,856,503      Dated December 24, 1974

Inventor(s) Tony Cebalo

It is certified that error appears in the above-identified patent and that said Letters Patent are hereby corrected as shown below:

In column 7, line 44, "thiadiazole-2" should read ---thiadiazol-2---.

In column 8, line 61, "1 1/2 1/2" should read ---1-1/2---.

In column 10, line 10, "1,3,4-dimethyl" should read ---1,3-dimethyl---.

In column 10, example 28 of the table, under column $R_2$, "HH" should read ---H---; under column $R_4$, "$CH_3$" should read ---H---; under column $R_5$, "166-168" should read ---$CH_3$---; and under the column Melting Point °C, insert ---166-168---.

In column 11, example 43 of the table, under the column Melting Point, °C, "101-102" should read ---101-103---.

In column 15, compounds 28 and 40 should read as follows:

| Cpd. No. | Rate, No./A | \multicolumn{19}{c}{Preemergent} | | | | | | | | | | | | | | | | | | | Postemergent | | | | | | |
|---|---|---|---|---|---|---|---|---|---|---|---|---|---|---|---|---|---|---|---|---|---|---|---|---|---|---|
| | | A | B | C | D | E | F | G | H | J | K | L | M | N | O | P | Q | R | S | T | A | M | O | P | R | S | T |
| 28 | 1 | 1 | 1 | 1 | 1 | 1 | 1 | 1 | 1 | 1 | 1 | 1 | 1 | 1 | 1 | 1 | 1 | 1 | 1 | 1 | 1 | 3 | 2 | 4 | 2 | 1 | 3 |
|  | 2 | 1 | 1 | 1 | 1 | 1 | 2 | 1 | 1 | 1 | 2 | 1 | 1 | 1 | 2 | 1 | 1 | 1 | 1 | 1 | 2 | 3 | 3 | 4 | 3 | 1 | 4 |
|  | 4 | 1 | 1 | 1 | 2 | 3 | 2 | 1 | 1 | 1 | 2 | 1 | 2 | 2 | 3 | 1 | 1 | 2 | 1 | 1 | 2 | 3 | 3 | 4 | 3 | 1 | 4 |
| 40 | .05 | - | - | - | - | - | - | - | - | - | - | - | - | - | - | - | - | - | - | - | 1 | 3 | 3 | 4 | 3 | 3 | 3 |
|  | 1 | 2 | 2 | 1 | 2 | 4 | 5 | 1 | 5 | 4 | 3 | 3 | 3 | 4 | 5 | 4 | 3 | 4 | 5 | 5 | 4 | 5 | 5 | 5 | 5 | 5 | 5 |
|  | 4 | 5 | - | - | - | - | - | - | - | - | - | - | - | 4 | - | 4 | 5 | - | 4 | 5 | 5 | 5 | 5 | 5 | 5 | 4 | 5 | 5 |

UNITED STATES PATENT OFFICE
CERTIFICATE OF CORRECTION

Patent No. 3,856,503　　　　　　　　Dated December 24, 1974

Inventor(s) Tony Cebalo　　　　　　　　PAGE - 2

It is certified that error appears in the above-identified patent and that said Letters Patent are hereby corrected as shown below:

In column 17, compound 55, under the Preemergent column following the rate 0.5, insert ---1 1 1 1 1 1 1 1 1 1 - 1 1 1 1 1 1 1---. Under the corresponding Postemergent column, insert ---2 4 4 5 4 4 5---.

In column 19, line 5, "fromm" should read ---from---.

In column 19, line 32, "applications" should read ---application---.

In column 19, line 37, "isoph-" should read ---isopho- ---.

In column 19, line 47, "compounds described" should read ---compounds and compositions described---.

In column 19, line 52, "selectively" should read ---selectivity---.

In column 22, line 13, "yl)-1)" should read ---yl)---.

Signed and Sealed this twenty-second Day of July 1975

[SEAL]

Attest:

RUTH C. MASON
Attesting Officer

C. MARSHALL DANN
Commissioner of Patents and Trademarks

Disclaimer 3,856,503.—*Tony Cebalo*, Indianapolis, Ind. HERBICIDAL METHOD AND COMPOSITIONS. Patent dated Dec. 24, 1974. Disclaimer filed Sept. 20, 1976, by the assignee, *Air Products and Chemicals, Inc.*

Hereby enters this disclaimer to claim 3 of said patent.

[*Official Gazette November 23, 1976.*]